Sept. 20, 1966  J. A. PENNINGTON  3,273,906
ROTATING SHAFT SEAL
Filed Aug. 15, 1963  2 Sheets-Sheet 1

James A. Pennington
INVENTOR.

BY *Clarence A. O'Brien*
*and Harvey B. Jacobson*
Attorneys

Sept. 20, 1966    J. A. PENNINGTON    3,273,906
ROTATING SHAFT SEAL
Filed Aug. 15, 1963    2 Sheets-Sheet 2
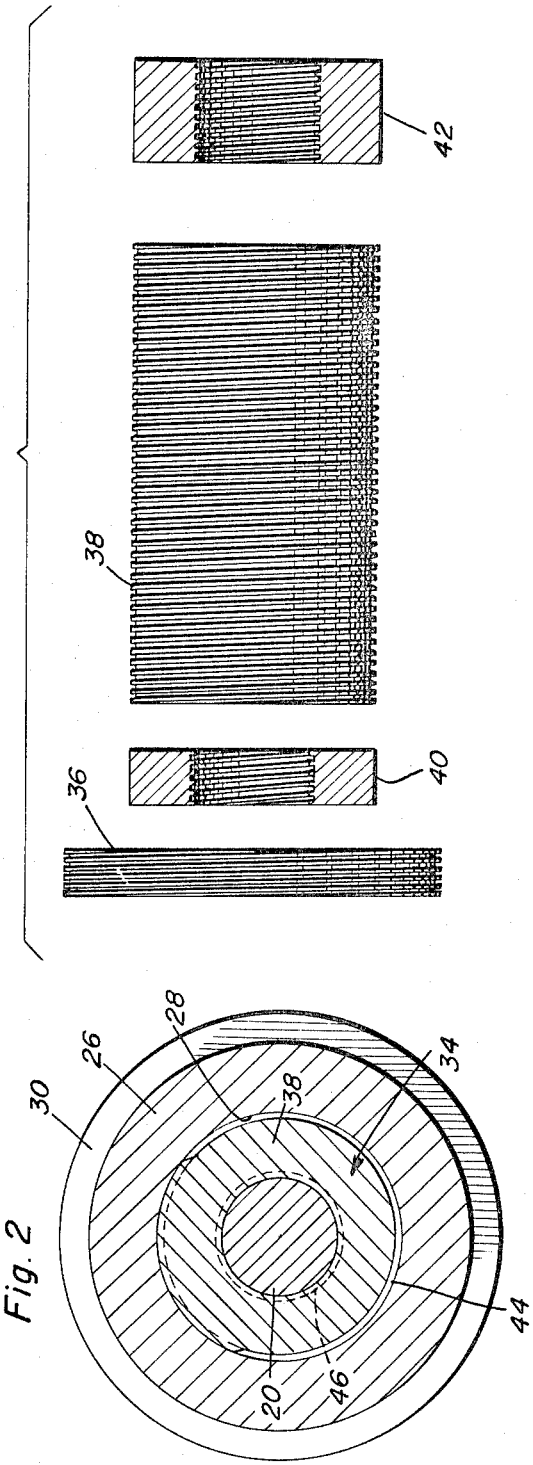
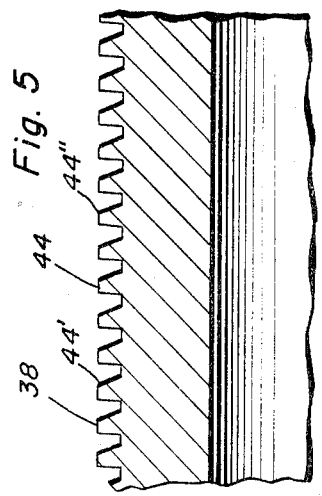
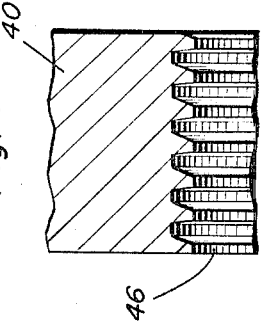
James A. Pennington
INVENTOR.

United States Patent Office 3,273,906
Patented Sept. 20, 1966

3,273,906
ROTATING SHAFT SEAL
James A. Pennington, Brownsville, Tex.
(4410 E. Xyler St., Tulsa, Okla.)
Filed Aug. 15, 1963, Ser. No. 302,279
7 Claims. (Cl. 277—134)

This invention relates to a novel and useful seal assembly for forming a seal between a journaled shaft and a bore through which the shaft is loosely received.

Various types of centrifugal pumps are utilized to pump fluids and most of these pumps include packing seals which are disposed in relatively tight frictional engagement with the impeller shaft and the casing supporting the impeller shaft whereby leakage of the fluid being pumped past the seal may be substantially eliminated. However, seals which are disposed in tight frictional engagement with impeller shafts cause the operating temperature of the pump to be appreciably increased and also create appreciable drag on the impeller shaft. Still further, packing seals of the conventional type, because of their frictional engagement with the impeller shaft, eventually wear to a point such that clearance between the packing seal and the shaft is realized and the fluid being pumped may therefore be readily passed between the seal and the shaft and outwardly of the pumping chamber.

The main object of this invention is to provide a rotating shaft seal which is specifically adapted to be utilized in centrifugal fluid pumps and which is constructed in a manner whereby an effective seal between a rotating shaft and the housing from which the rotating shaft is journaled may be formed without actual physical contact between the shaft and the housing or any relatively movable parts of the assemblage including the housing, the impeller shaft and the shaft seal assembly. In this manner, the drag on the impeller shaft effected by the rotating shaft seal will be maintained at a minimum and there will be no wear of the rotating shaft seal inasmuch as it will not come into contact with any part which is movable relative thereto.

A further object of this invention, in accordance with the immediately preceding object, is to provide a rotating shaft seal assembly constructed in a manner whereby the seal itself will effect a pumping action when any fluid has a tendency to work its way from the pumping chamber axially of the shaft. This pumping action will, of course, have a tendency to pump the free fluids back toward the pumping chamber.

Still another object of this invention, in accordance with the preceding object, is to provide a rotating shaft seal assembly constructed in a manner whereby an extremely tortuous passage is formed through which any leaking fluid must pass before moving completely through the shaft seal, which tortuous passage will appreciably reduce the pressure of any leaking fluids and thereby render the pumping features of the shaft seal more effective in pumping the leaking fluid back toward the pumping chamber.

A final object of this invention to be specifically enumerated herein is to provide a rotating shaft seal assembly in accordance with the preceding objects which will conform to conventional forms of manufacture, be of simple construction and easy to install so as to provide a device that will be economically feasible, long lasting and readily adaptable to numerous type of centrifugal pumps now in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal sectional view of a conventional form of centrifugal pump taken substantially upon a plane passing through the axis of rotation of the impeller shaft of the pump and showing the rotating shaft seal assembly of the instant invention operatively positioned relative to the housing and impeller shaft for preventing leakage of the fluid being pumped from the pumping chamber axially of the impeller shaft;

FIGURE 2 is a transverse sectional view taken substantially upon the plane indicated by the section line 2—2 of FIGURE 1;

FIGURE 3 is an exploded side elevational view of the component parts of the rotating shaft seal shown in their correct sequence relative to each other and with portions of two parts of the seal assembly being broken away and shown in section;

FIGURE 4 is an enlarged fragmentary longitudinal sectional view clearly illustrating the details of construction of the internal threads carried by one of the seal assembly components; and FIGURE 5 is an enlarged fragmentary sectional view showing more clearly the details of construction of the external threads carried by another of the seal assembly components.

Figure 1:
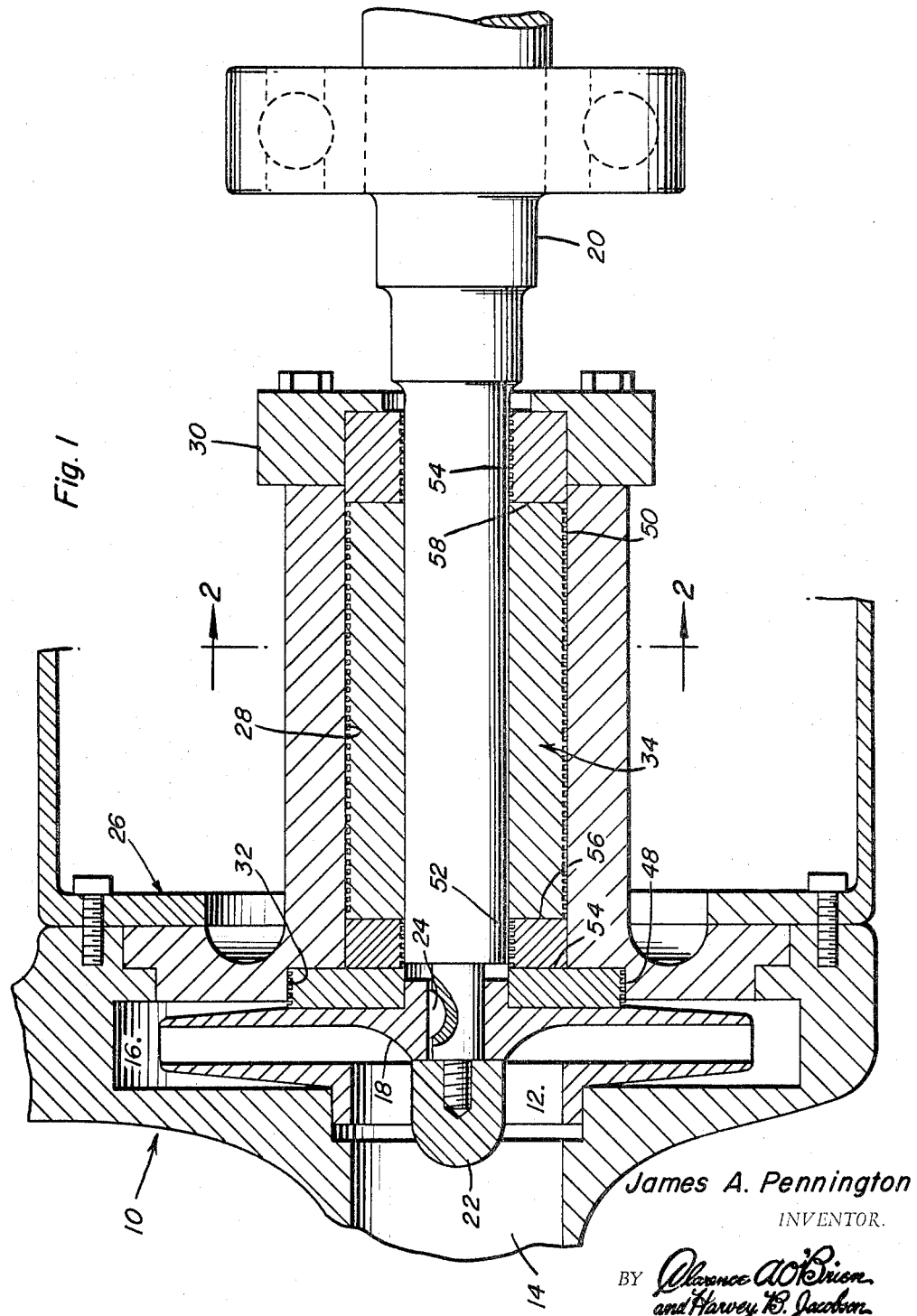

Referring now more specifically to the drawings, FIGURE 1 illustrates a conventional form of Ingersoll-Rand 1 CRVN centrifugal pump which has been modified to include the rotating shaft seal of the instant invention in lieu of the conventional types of shaft packings which are tightly frictionally engaged with the rotating shaft and held stationary and supported in sealed relation relative to the housing through which the rotating shaft extends.

The centrifugal pump is generally designated by the reference numeral 10 and includes a pumping chamber 12 including an inlet 14 and an outlet 16. A rotor 18 is mounted on one end of the impeller shaft 20 by means of a retaining nut 22 and is keyed to the shaft 20 by means of a key 24.

The housing of the pump 10 is generally referred to by the reference numeral 26 and includes a portion defining a bore 28. A portion of the bore 28 is also formed in the packing gland 30 and the bore 28 includes a counterbore 32 on the end thereof adjacent the pumping chamber 12.

The rotating shaft seal assembly of the instant invention is generally designated by the reference numeral 34 and includes, as can best be seen from FIGURE 2 of the drawings, a pair of first members 36 and 38 and a pair of second members 40 and 42. The members 36, 38, 40 and 42 are each generally cylindrical and it will be noted that the first cylindrical members 36 and 38 are stationarily supported from the impeller shaft 20 and are snugly received in the counterbore 32 and the central portion of the bore 28 respectively. The second cylindrical members 40 and 42 are fixedly secured in the opposite ends of the bore 28 and snugly receive therethrough the corresponding portions of the impeller shaft 20.

It will be noted from a comparison of FIGURES 3–5 of the drawings that the first cylindrical members 36 and 38 are provided with external buttress threads 44 and that the second cylindrical members 40 and 42 are provided with internal buttress threads 46.

The crown portions of the threads 44 of the first member 38 have a radial clearance with the counterbore 32 of approximately .003 inch as at 48. A similar clearance is also provided between the crown portions of the threads 44 of the first member 38 as at 50. In addition, the crown portions of the threads 46 carried by the second members 40 and 42 also have a radial clearance of .003 inch as at 52 and 54, respectively. Further, there is an axial clearance between the first and second members 36 and 40 of approximately .005 inch as at 54, an axial clearance of approximately .015 inch between the members 38 and 40 as at 56, and an axial clearance of approximately .006 between the members 38 and 42 as at 58. The above clearances are those of the component parts when they are cold.

After the pump 10 has reached its operating temperature, the clearance at 54 will increase by approximately .005 inch giving a hot clearance of .010 inch, the clearance at 56 will decrease by approximately .005 inch giving a hot clearance of .010 inch, and the clearance at 58 will increase by approximately .004 inch giving a hot clearance of .010 inch. Thus, when the pump 10 is at its operating temperature, the clearance at points 54, 56 and 58 will each be approximately .010 inch.

In operation, and assuming that the shaft 20 rotates in a clockwise direction as viewed from the left end of FIGURE 1, the threads 44 on the first members 36 and 38 are righthanded threads and the threads 46 on the second members 40 and 42 are lefthanded threads. In this manner, rotation of the shaft 20 in a clockwise direction will have a tendency to pump any leakage of fluid backward to the pumping chamber 12. In addition, inasmuch as the first and second members are alternately spaced, it may be seen that any fluid tending to leak from the pumping chamber 12 outwardly of the packing glands 30 will have to make six right-angle turns in addition to passing through the shaft seal and resisting the pumping action of the latter. Further, it may be seen from FIGURE 5 that the trailing faces 44' of the threads 44 are inclined outwardly toward the left or toward the source of fluid under pressure. This inclined trailing face on the threads has a greater tendency to draw any fluid slipping past the flat outer faces 44" of the threads 44 into the groove defined between the threads than would the trailing faces of straight acme threads. Accordingly, it may be seen that the rotation shaft seal assembly of the instant invention is capable of establishing a substantially 100% seal between the shaft and the housing 26 without any relatively movable portions of the shaft and seal assembly coming into frictional engagement with each other or engagement with a portion of the housing or the shaft 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a housing from which a shaft is journaled and including a bore through which said shaft projects, a seal assembly for forming a seal between said shaft and the portions of said housing defining said bore, said assembly comprising first and second forms of seal members encircling said shaft and alternately spaced longitudinally thereof, each of said first form of seal members being carried by said shaft for rotation therewith and defining a diametric enlargement thereof and each of said second form of seal members comprising a generally cylindrical member stationarily secured in said bore and defining a diametrically reduced portion thereof, the outer and inner surfaces of said first and second members, respectively, being oppositely threaded, there being minimum operating clearance between the threads on said first and second members and said bore and said shaft, respectively, the adjacent ends of said first and second forms of seal members including opposing complementary generated and spaced end faces with at least portions thereof disposed in minimum spaced relation.

2. The combination of claim 1 wherein said assembly includes a pair of first seal members and a pair of second seal members.

3. The combination of claim 2 wherein said bore includes a counterbore at one end, one of said externally threaded cylindrical members is snugly received in said counterbore.

4. The combination of claim 1 wherein the radial clearance between said first member and said bore and between said second member and said shaft is approximately .003 inch.

5. The combination of claim 1 wherein said portions of said end faces of said first and second members are spaced apart approximately .010 inch at operating temperature.

6. The combination of claim 1 wherein the threads on said first and second members comprise buttress threads.

7. In combination with a housing from which a shaft is journaled and including a bore through which said shaft projects, a seal assembly for forming a seal between said shaft and the portions of said housing defining said bore, said assembly comprising first and second forms of seal members encircling said shaft and alternately spaced longitudinally thereof, each of said first form of seal members being carried by said shaft for rotation therewith and defining a diametric enlargement thereof and each of said second form of seal members comprising a generally cylindrical member stationarily secured in said bore and defining a diametrically reduced portion thereof, said first and second members being oppositely threaded, there being minimum operating clearance between the threads on said first and second members and said bore and said shaft, respectively, the adjacent ends of said first and second forms of seal members including opposing complementary generated spaced end faces with at least portions thereof disposed in minimum spaced relation, said seal members including at least one seal member of one form of seal member and two seal members of the other form of seal members.

References Cited by the Examiner

UNITED STATES PATENTS

| 608,698 | 8/1898 | Meeker | 277—134 X |
| 1,978,239 | 10/1934 | Wheeler | 277—134 X |
| 2,631,071 | 3/1953 | Alden | 277—134 X |

SAMUEL ROTHBERG, *Primary Examiner.*